(12) United States Patent  (10) Patent No.: US 8,793,420 B2
Roh  (45) Date of Patent: Jul. 29, 2014

(54) SYSTEM ON CHIP, ELECTRONIC SYSTEM INCLUDING THE SAME, AND METHOD OF OPERATING THE SAME

(75) Inventor: Hong Ho Roh, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 35 days.

(21) Appl. No.: 13/604,516

(22) Filed: Sep. 5, 2012

(65) Prior Publication Data

US 2013/0073762 A1  Mar. 21, 2013

(30) Foreign Application Priority Data

Sep. 19, 2011 (KR) .................. 10-2011-0093653

(51) Int. Cl.
*G06F 13/00* (2006.01)

(52) U.S. Cl.
USPC ........................................ 710/110; 710/116

(58) Field of Classification Search
USPC ................................................. 710/107–118
See application file for complete search history.

(56) References Cited

U.S. PATENT DOCUMENTS

| 5,761,452 | A | 6/1998 | Hooks et al. |
| 5,802,330 | A | 9/1998 | Dutton |
| 5,805,840 | A | 9/1998 | Dutton |
| 6,898,649 | B2 | 5/2005 | Goudie |
| 2007/0233923 | A1 | 10/2007 | Lee |

*Primary Examiner* — Clifford Knoll
(74) *Attorney, Agent, or Firm* — F. Chau & Associates, LLC

(57) ABSTRACT

A system-on-chip (SoC), an electronic system including the same, and a method of operating the same are provided. The method includes setting real-time information indicating whether a master block is a real-time block in a real-time information register of the master block. A weight is set in a weight register of the master block. Buffer information of the master block is checked. A quality-of-service (QoS) signal is generated using the buffer information and the weight. A priority of the master block to use the bus is determined based on the QoS signal.

22 Claims, 14 Drawing Sheets

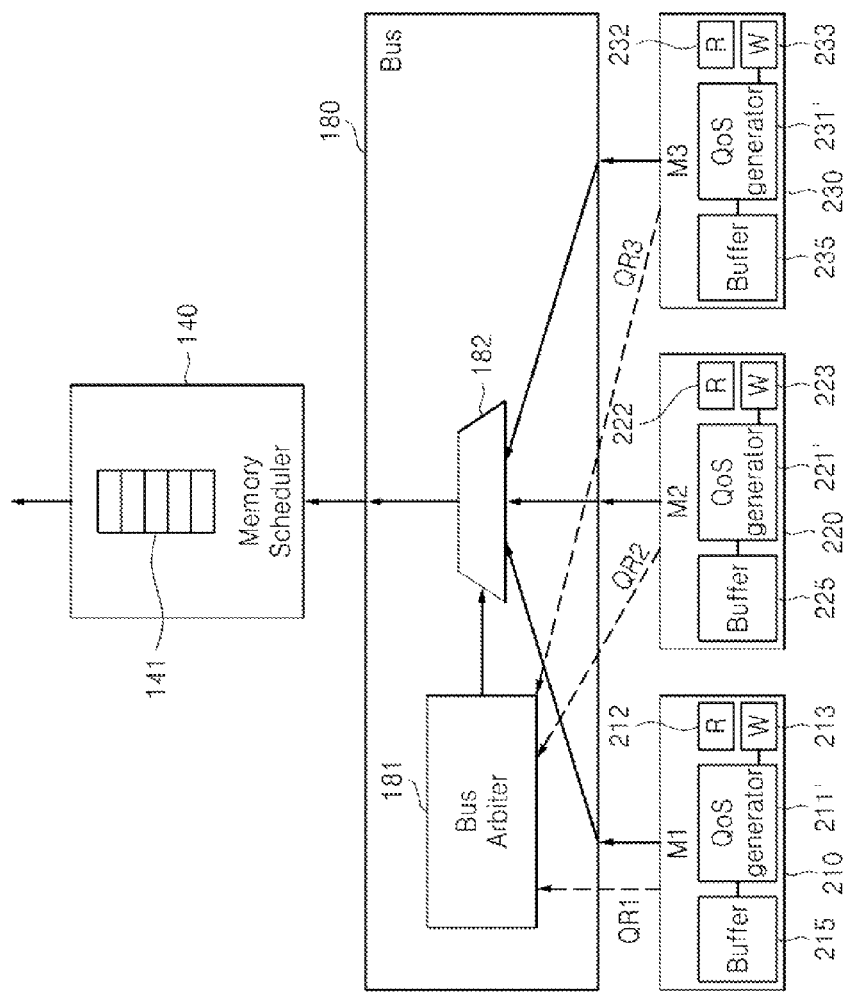

FIG. 4

| Master | Weight | Normalized FIFO level | QRx value (x=1,2,3) |
|---|---|---|---|
| M1 | 60 | M1_FL | 0.6 × M1_FL |
| M2 | 10 | M2_FL | 0.1 × M2_FL |
| M3 | 30 | M3_FL | 0.3 × M3_FL |

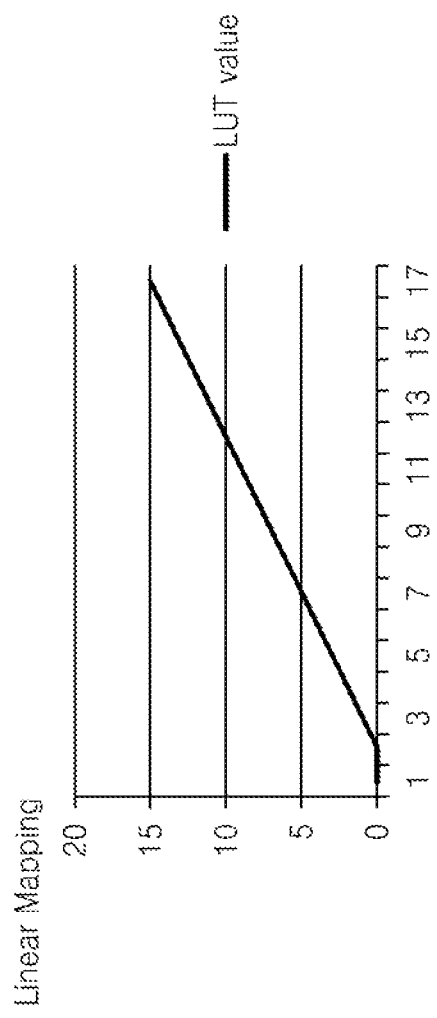

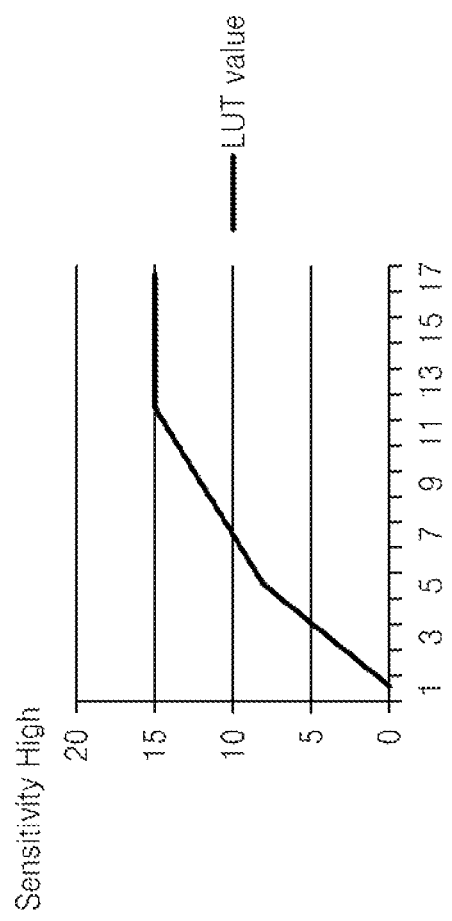

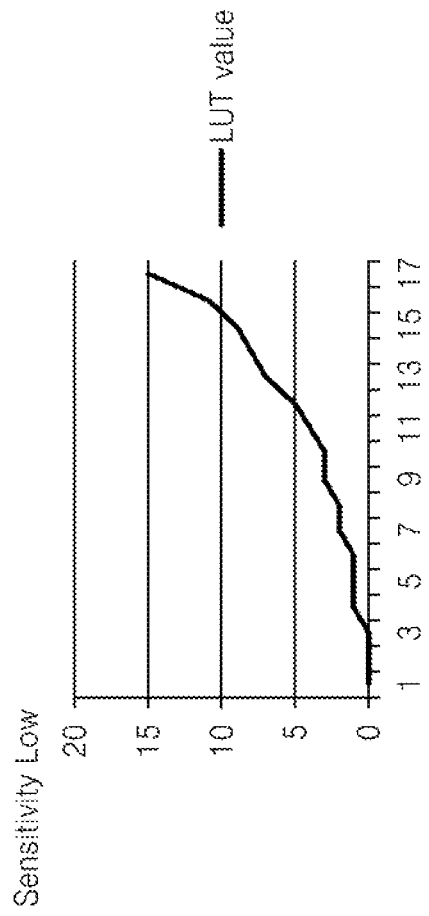

FIG. 7A

| LUT index | LUT value |
|---|---|
| 0 | 0 |
| 1 | 0 |
| 2 | 1 |
| 3 | 2 |
| 4 | 3 |
| 5 | 4 |
| 6 | 5 |
| 7 | 6 |
| 8 | 7 |
| 9 | 8 |
| 10 | 9 |
| 11 | 10 |
| 12 | 11 |
| 13 | 12 |
| 14 | 13 |
| 15 | 14 |
| 16 | 15 |

FIG. 7B

| LUT index | LUT value |
|---|---|
| 0 | 0 |
| 1 | 2 |
| 2 | 4 |
| 3 | 6 |
| 4 | 8 |
| 5 | 9 |
| 6 | 10 |
| 7 | 11 |
| 8 | 12 |
| 9 | 13 |
| 10 | 14 |
| 11 | 15 |
| 12 | 15 |
| 13 | 15 |
| 14 | 15 |
| 15 | 15 |
| 16 | 15 |

FIG. 7C

| LUT index | LUT value |
|---|---|
| 0 | 0 |
| 1 | 0 |
| 2 | 0 |
| 3 | 1 |
| 4 | 1 |
| 5 | 1 |
| 6 | 2 |
| 7 | 2 |
| 8 | 3 |
| 9 | 3 |
| 10 | 4 |
| 11 | 5 |
| 12 | 7 |
| 13 | 8 |
| 14 | 9 |
| 15 | 11 |
| 16 | 15 |

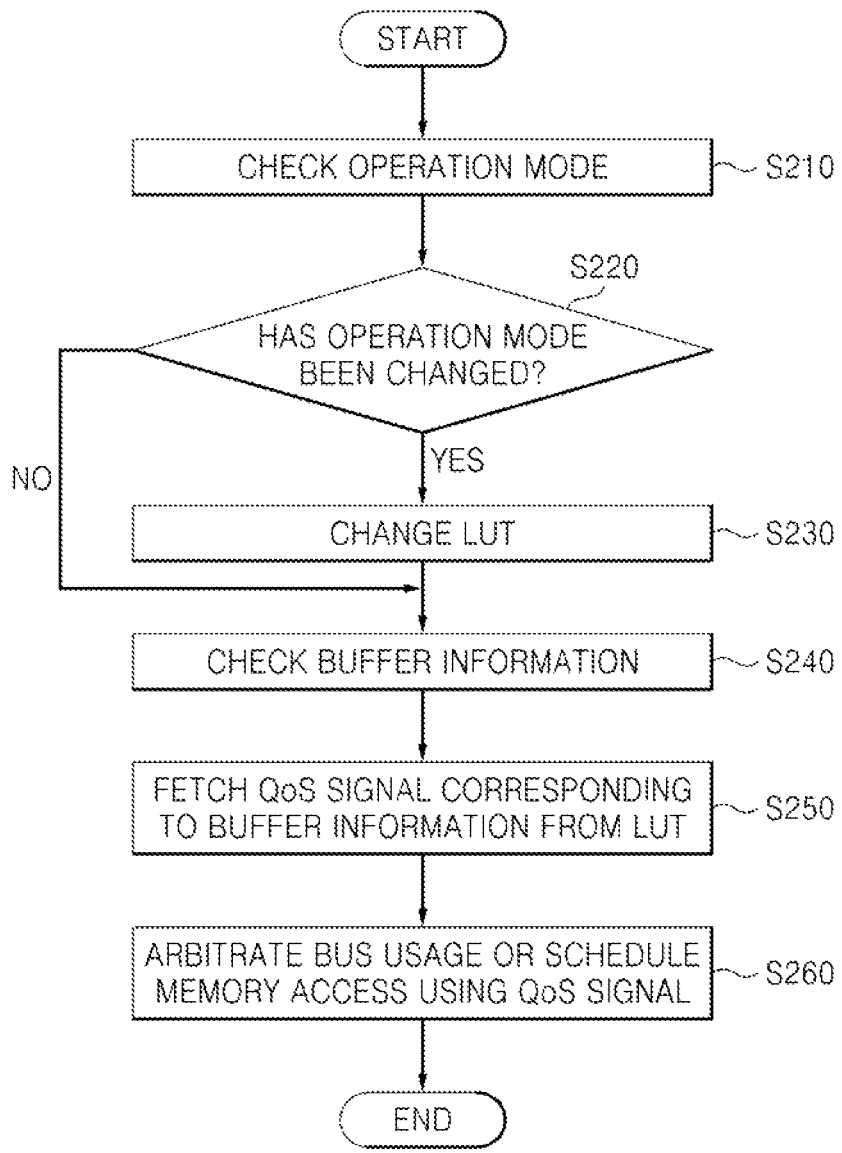

SYSTEM ON CHIP, ELECTRONIC SYSTEM INCLUDING THE SAME, AND METHOD OF OPERATING THE SAME

CROSS-REFERENCE TO RELATED APPLICATIONS

This application claims priority under 35 U.S.C. §119(a) to Korean Patent Application No. 10-2011-0093653 filed on Sep. 16, 2011, the disclosure of which is hereby incorporated by reference in its entirety.

TECHNICAL FIELD

The present disclosure relates to system-on-chip, and more particularly, to a system-on-chip, an electronic system including the same, and a method of operating the same.

DISCUSSION OF THE RELATED ART

Embodiments of the inventive concept relate to a system-on-chip (SoC), and more particularly, to a SoC determining access priority of a bus or a slave block according to quality-of-service (QoS), an electronic system including the same, and a method of operating the same.

With the evolution of an on-chip bus system, QoS information, including, for example, information pertaining to various aspects of a connection, such as service response time, loss, signal-to-noise ratio, cross-talk, echo, interrupts, frequency response, loudness levels, etc. of a master block is used as scheduling information for a bus and a memory controller. Accordingly, bus systems using arbitration to maintain acceptable QoS for a connection has been provided. Accordingly, transition of QoS information from a master block to a bus system is useful in achieving acceptable performance.

A SoC for multimedia data processing includes various types of master blocks and slave blocks. The SoC is used in various ways. For example, a single SoC may be used in a video camcorder, a telephone handset, or a table personal computer (PC). Each of these products has different operation modes. For example, a video camcorder has operation modes such as a video shooting mode, a video display mode, and a still image display mode. Accordingly, a master block, a bus, a memory system and so on included in the SoC need to be designed to operate properly in various operation modes. In the field of inter-chip bus/memory systems that are important to the construction of SoC, the concept of QoS of network systems has been introduced and approaches for meeting the requirements for system performance such as bandwidth, latency and real-time have been developed.

In particular, when real-time is required but requirements are not met, QoS decreases. For example, a liquid crystal display (LCD) controller that controls an LCD device is a master block with real-time constraints and may have deterioration in the quality of picture when the requirements are not met.

SUMMARY

According to exemplary embodiments of the inventive concept, there is provided a method of operation a system-on-chip (SoC) including a master block, a slave block, and a bus. The method includes setting real-time information in a real-time information register of the master block, the real-time information indicating whether the master block is a real-time block. A weight is set in a weight register of the master block. Buffer information of the master block is checked. A quality-of-service (QoS) signal is generated using the buffer information and the weight. Priority of the master block to use the bus is determined based on the QoS signal.

The method may further include determining priority of the master block to access the slave block based on the QoS signal.

The determining the priority of the master block to use the bus may include the master block sending a bus use request signal comprising the QoS signal to a bus arbiter and the bus arbiter permitting a master block having higher priority to use the bus based on QoS signals respectively comprised in at least two bus use request signals input to the bus arbiter.

According to exemplary embodiments of the inventive concept, there is provided a method of operation a SoC including a master block, a slave block, and a bus, the master block and slave block communicating with each other through the bus. The method includes storing a look-up table comprising a plurality of quality-of-service (QoS) signals in the master block. Buffer information of the master block is checked. A QoS signal corresponding to the buffer information is fetched from the look-up table. Priority of the master block is determined to use the bus based on the QoS signal.

The look-up table may be changed according to an operation mode of the master block.

The method may further include selecting a look-up table from among a plurality of look-up tables according to the operation mode of the master block when the plurality of look-up tables are provided.

According to exemplary embodiments of the inventive concept, there is provided a SoC including a plurality of master blocks, a slave block, and a bus configured to connect the master blocks with the slave block. Each of the master blocks may include a real-time information register configured to store real-time information indicating whether each master block is a real-time block, a weight register configured to store a weight of the master block, a buffer configured to store data to be transmitted to or received from the bus, and a QoS generator configured to check information of the buffer and generate a QoS signal using the buffer information.

The bus may include a bus arbiter configured to determine priority of the master blocks to use the bus based on QoS signals.

The slave block may determine priority of the master block to access the slave block based on the QoS signal.

The slave block may include a memory scheduler configured to schedule an access to a memory.

According to exemplary embodiments of the inventive concept, there is provided an electronic system including the system-on-chip (SoC); and a non-volatile memory configured to store data used by the SoC.

A method of operation a system-on-chip (SoC), includes storing real-time information indicating whether a first master block is a real-time block in a first register of the first master block. Real-time information indicating whether a second master block is a real-time block is stored in a first register of the second master block. Weight information for the first master block is stored in a second register of the first master block based on the real-time information indicating whether the first master block is a real-time block. Weight information for the second master block is stored in a second register of the second master block based on the real-time information indicating whether the second master block is a real-time block. Buffer information of the first and second master blocks is checked. A quality-of-service (QoS) signal is generated for the first master block using the buffer information and the weight information for the first master block. A quality-of-service (QoS) signal for the second master block is generated using the buffer information and the weight information for the second master block. A relative priority of the first and second master blocks for using the bus is determined based on the generated QoS signals for the first and second master block.

BRIEF DESCRIPTION OF THE DRAWINGS

The above and other features and aspects of the inventive concept will become more apparent by describing in detail exemplary embodiments thereof with reference to the attached drawings in which:

FIG. 3 is a conceptual diagram illustrating a method of operating the SoC according to exemplary embodiments of the inventive concept;

FIG. 4 is a table illustrating a method of generating QoS information according to exemplary embodiments of the inventive concept;

FIGS. 6A through 6C are graphs showing relation between a first in, first-out (FIFO) level and QoS information according to exemplary embodiments of the inventive concept;

FIGS. 7A through 7C are look-up tables (LUTs) corresponding to the graphs illustrated in FIGS. 6A through 6C, respectively;

FIG. 9 is a flowchart illustrating a method of operating a SoC according to exemplary embodiments of the inventive concept.

DETAILED DESCRIPTION OF THE EMBODIMENTS

Figure 1:
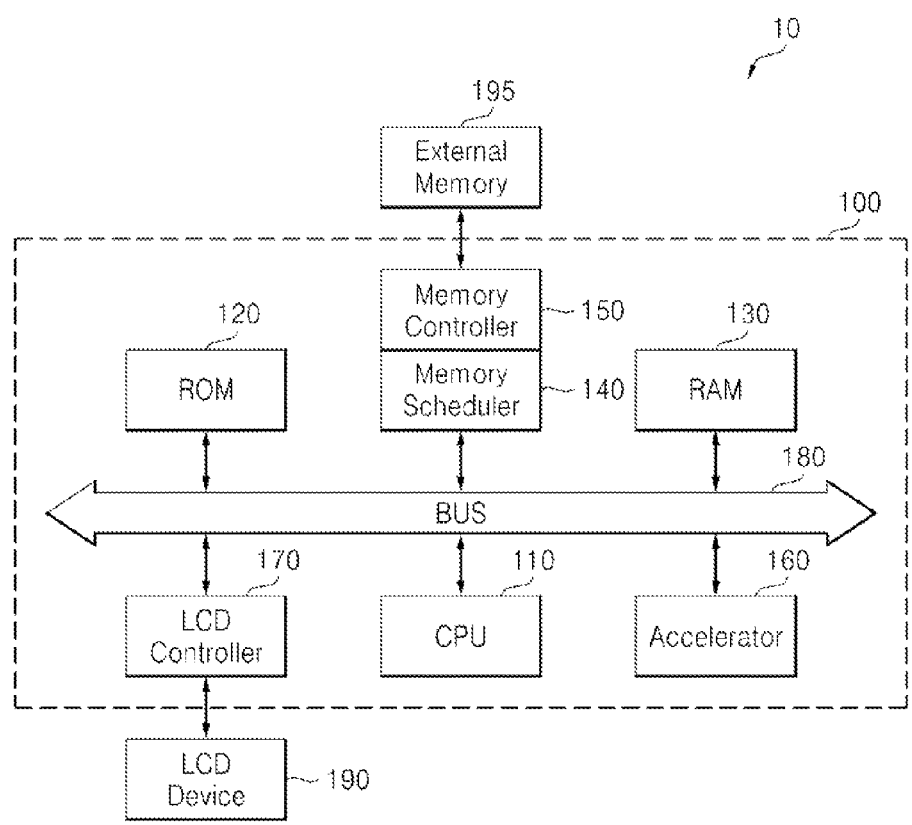
FIG. 1 is a block diagram illustrating an electronic system including a system-on-chip (SoC) according to exemplary embodiments of the inventive concept.

The inventive concept now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers may refer to like elements throughout the disclosure.

It will be understood that when an element is referred to as being "connected" or "coupled" to another element, it can be directly connected or coupled to the other element or intervening elements may be present.

FIG. 1 is a block diagram illustrating an electronic system 10 including a system-on-chip (SoC) 100 according to exemplary embodiments of the inventive concept. The electronic system 10 may be implemented as a handheld device such as a mobile telephone, a smart phone, a tablet computer, a personal digital assistant (PDA), an enterprise digital assistant (EDA), a digital still camera, a digital video camera, a portable multimedia player (PMP), a personal navigation device or portable navigation device (PND), a handheld game console, an e-book reader, etc.

The electronic system 10 may include the SoC 100, a display device 190, and an external memory 195. The SoC 100 may include a central processing unit 110, a read-only memory (ROM) 120, a random access memory (RAM) 130, a memory scheduler 140, a memory controller 150, an accelerator 160, a display device controller 170, and a bus 180. The SoC 100 may also include other elements, e.g., a power management unit, a television (TV) processor, etc.

The CPU 110, which may be referred to as a processor, may process or execute programs and/or data stored in the memory 120, 130, or 195. For example, the CPU 110 may process or execute the programs and/or the data in response to a clock signal output from a clock signal generator (not shown).

The CPU 110 may include a multi-core processor. The multi-core processor is a single computing component with two or more independent actual processors (referred to as cores). Each of the processors may read and execute program instructions. The multi-core processor can drive a plurality of accelerators simultaneously, and therefore, a data processing system including the multi-core processor may perform multi-acceleration.

The programs and/or the data stored in the memory 120, 130, or 195 may be loaded to a memory in the CPU 110 when necessary.

The ROM 120 may store permanent programs and/or data. The ROM 120 may include erasable programmable ROM (EPROM) or electrically erasable programmable ROM (EEPROM).

The RAM 130 may temporarily store programs, data, or instructions. The programs and/or data stored in the memory 120 or 195 may be temporarily stored in the RAM 130 according to the control of the CPU 110 or a booting code stored in the ROM 120. The RAM 130 may include, for example, dynamic RAM (DRAM) or static RAM (SRAM).

The accelerator 160 may refer to a hardware device or a co-processor for increasing the performance of processing multimedia or multimedia data such as text, audio, still images, animation, video, two-dimensional data, or three-dimensional data.

For clarity of the description, only one accelerator 160 is illustrated in FIG. 1, but the SoC 100 may include a plurality of accelerators. At least one application program may drive a single accelerator.

The memory controller 150 is used for interfacing with the external memory 195. The memory controller 150 controls the overall operation of the external memory 195 and controls the data communication between a host and the external memory 195. The memory controller 150 may control the external memory 195 to write or read data at the request of the host. The host may be a master device such as the CPU 110, the accelerator 160, or the display device controller 170.

The external memory 195 is a storage space for storing data and may store an operating system (OS) and various kinds of programs and data. The external memory 195 may include DRAM, but the inventive concept is not restricted to this arrangement. The external memory 195 may include non-volatile memory such as flash memory, phase-change RAM (PRAM), magnetoresistive RAM (MRAM), resistive RAM (ReRAM) or ferroelectric RAM (FeRAM). According to exemplary embodiments, the external memory 195 may be embedded in the SoC 100.

The memory scheduler 140 schedules priority order of access to the external memory 195. For example, when receiving access request signals from a plurality of master blocks, e.g., the CPU 110, the accelerator 160, and the display device controller 170 at the same time, the memory scheduler 140 may determine which of the master blocks has access priority over the other master blocks and may schedule priority order of access to the external memory 195.

The elements 110, 120, 130, 140, 160, and 170 may communicate with one another through the bus 180.

The display device 190 may display multimedia accelerated or processed by the accelerator 160 or a software accelerator loaded to the CPU 110. The display device 190 may be a liquid crystal display (LCD) device, but the inventive concept is not restricted to this configuration. In exemplary embodiments, the display device 190 may be a light emitting diode (LED) display device, an organic LED (OLED) display device, or one of other types of display devices.

The display device controller 170 controls the operations of the display device 190.

Figure 2A:
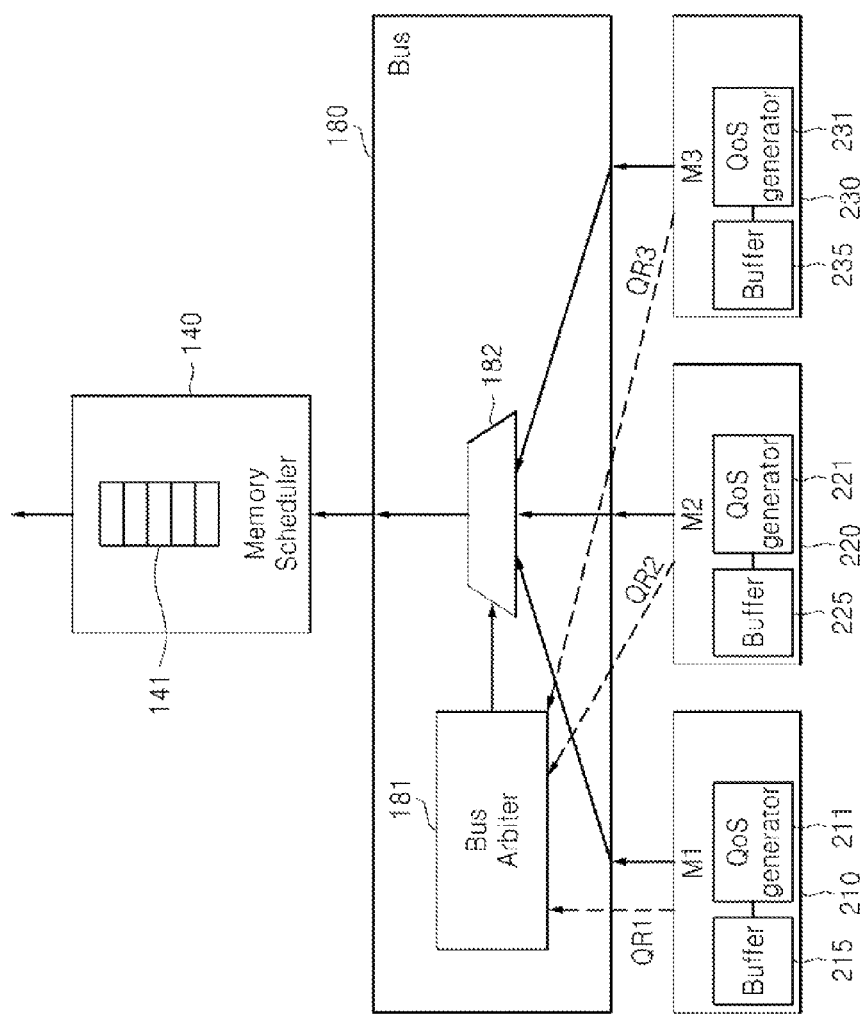
FIG. 2A is a conceptual diagram illustrating a method of operating the SoC according to exemplary embodiments of the inventive concept.
Figure 2B:
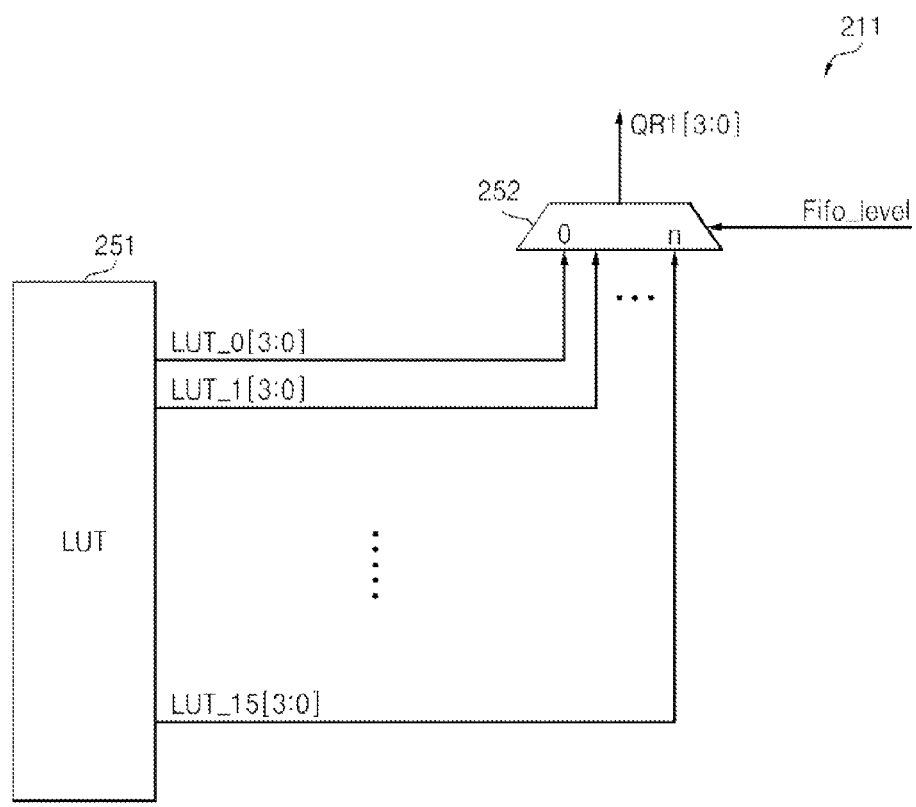
FIG. 2B is a block diagram illustrating a quality-of-service (QoS) generator illustrated in FIG. 2A.

FIG. 2A is a conceptual diagram illustrating a method of operating the SoC 100 according to exemplary embodiments of the inventive concept. FIG. 2B is a block diagram of a quality-of-service (QoS) generator 211 illustrated in FIG. 2A. Referring to FIGS. 1, 2A and 2B, the bus 180 may include a bus arbiter 181 and a multiplexer 182. A plurality of blocks 210, 220, and 230 are connected to the bus 180. The blocks 210, 220, and 230 are referred to as intellectual properties (IPs) and are divided into slave blocks and master blocks. The slave blocks only receive requests from other blocks while the master blocks can request slave blocks to communicate data. When necessary, a single block may function as both of a slave and a master.

Although three master blocks 210, 220, and 230 and one slave block 140 are illustrated in FIG. 2A, the inventive concept is not restricted to this specific configuration. A master block may be any one of the CPU 110, the accelerator 160, and the display device controller 170 illustrated in FIG. 1. Although not shown, a TV processor or a camera interface may be a master block.

The memory scheduler 140 illustrated in FIG. 1 may be a slave block. The memory scheduler may determine memory access priority and may maintain a queue of memory access requests 141 therein.

According to exemplary embodiments, the master blocks 210, 220, and 230 may include QoS generators 211, 221, and 231, respectively, and buffers 215, 225, and 235, respectively.

Each of the buffers 215, 225, and 235 may use a first in, first out (FIFO) method for processing data. Each of the buffers 215, 225, and 235 may receive transmission data from an input port of the master block 210, 220, or 230, array and manage data according to an input order of the data, sequentially read data beginning with one that comes in first, and sequentially transmit the data to an output port of the master block 210, 220, or 230. Alternatively, the buffers 215, 225, and 235 may include a queue, memory, register or flip-flop.

Each of the buffers 215, 225, and 235 may include a write buffer that stores data to be transmitted to a slave block and a read buffer that stores data received from a slave buffer.

The QoS generators 211, 221, and 231 may generate QoS information using buffer information. The buffer information indicates the degree of occupancy of a buffer. For example, the buffer information may indicate how much of the buffer is filled with data or empty of data in each master block. For example, buffer information of a write buffer may indicate to what extent the buffer is filled with data while buffer information of a read buffer may indicate how much the buffer is empty of data.

Referring to FIG. 2B, the QoS generator 211 may include a look-up table (LUT) 251, which includes a plurality of QoS information entries LUT_0[3:0] through LUT_15[3:0], and a selector 252.

The QoS generator 211 may select an entry corresponding to buffer information Fifo_level from the QoS information entries LUT_0[3:0] through LUT_15[3:0] stored in the LUT 251 and output the selected entry as QoS information QR1[3:0].

Although the LUT 251, as illustrated in FIG. 2B, includes the 16 QoS information entries LUT_0[3:0] through LUT_15 [3:0] and each QoS information entry is 4-bit data, the inventive concept is not restricted to this arrangement. For example, more or fewer QoS information entries may be used and each entry may use data of any number of bits. Only one QoS generator 211 is illustrated in FIG. 2B, but the other QoS generators 221 and 231 may have the same structure as the QoS generator 211.

Here, the LUT 251 may be predetermined according to the characteristic of the master block 210 when manufactured. The characteristic of the master block 210 may indicate whether the master block 210 is a real-time block. Each of the QoS generators 211, 221, and 231 may be programmed so that the LUT 251 may be changed depending on the operation mode of the master block 210, 220, or 230. For example, each of the QoS generators 211, 221, and 231 may include a plurality of predetermined LUTs and may select one of the LUTs according to the operation mode. Alternatively, each of the QoS generators 211, 221, and 231 may generate and store a LUT according to the operation mode.

The operation mode may be defined according to various function of a product using the SoC 100. For example, when the SoC 100 is used in a video camcorder, video shooting, video display, still image display and so on may be defined as an operation mode. When the SoC 100 is used in a portable phone, a communication mode, a camera mode, an MP3 mode and so on may be defined as an operation mode. The operation mode may be set or changed using a user interface (not shown) of a product using the SoC 100. For example, when a product using the SoC 100 is a portable phone, a user may choose a photo shooting mode or a video shooting mode on the menu of a user interface and the operation mode of the SoC 100 may be changed in accordance with the user's choice. When the operation mode is changed through the user interface, the CPU 110 may inform other master blocks of the changed operation mode.

The QoS generator 211 of the first master block 210 generates first QoS information QR1 based on a LUT, which is set according to the characteristic or operation mode of the first master block 210, in response to buffer information of the first master block 210. In a similar manner, the QoS generators 221 and 231 of the respective second and third master blocks 220 and 230 generate second and third QoS information QR2 and QR3, respectively.

The LUT will be described below in detail with reference to FIGS. 6A through 7C.

The first through third QoS information QR1, QR2, and QR3 is provided to the bus arbiter 181 and the memory scheduler 140. The bus arbiter 181 determines bus use priority based on the first through third QoS information QR1, QR2, and QR3.

Each of the master blocks 210, 220, and 230 may output a request signal for requesting to use the bus 180 to the bus arbiter 181 to transmit data through the bus 180. Each of the first through third QoS information QR1, QR2, and QR3 may be included in the request signal and transmitted to the bus arbiter 181.

The bus arbiter 181 determines bus use priority based on the QoS information QR1, QR2, and QR3 of the respective master blocks 210, 220, and 230. The bus arbiter 181 may determine the bus use priority so that the QoS information QR1, QR2, or QR3 having a higher value has higher priority.

When the bus use request signals from two master blocks are active, the bus arbiter 181 determines a master block that has higher priority over the other master block based on the QoS information, as described above, and permits the master block having the higher priority to use the bus 180. If there are two or more master blocks having the same priority, the bus arbiter 181 may permit the master blocks to use the bus 180 in a round robin.

The bus arbiter 181 may include a priority register that stores priority information of each of the master blocks 210, 220, and 230.

The multiplexer 182 multiplexes data received from the master blocks 210, 220, and 230 in response to an output signal of the bus arbiter 181, and the master blocks 210, 220, and 230 use the bus 180 in descending order of their priorities.

Like the bus arbiter 181, the memory scheduler 140 may also determine the priority of memory access using the QoS information QR1, QR2, and QR3 of the respective master blocks 210, 220, and 230.

For example, the master blocks 210, 220, and 230 may respectively transmit memory access request signals respectively including QoS information QR1, QR2, and QR3 to the memory scheduler 140. When receiving two or more memory access request signals, the memory scheduler 140 may permit the master block 210, 220, or 230 that has the highest priority memory access based on the QoS information QR1, QR2, and QR3.

FIG. 3 is a conceptual diagram illustrating a method of operating the SoC 100 according to exemplary embodiments of the inventive concept. Many of the features illustrated in FIG. 3 are similar to those illustrated in FIG. 2 in terms of structure and operation, thus differences therebetween will be described to avoid redundancy.

Referring to FIG. 3, the master block 210 may include a QoS generator 211', registers 212 and 213, and the buffer 215. The master block 220 may include a QoS generator 221', registers 222 and 223, and the buffer 225. The master block 230 may include a QoS generator 231', registers 232 and 233, and the buffer 235.

The registers 212, 213, 222, 223, 232, and 233 may include the real-time information registers 212, 222, and 232 and weight registers 213, 223, and 233.

Each of the real-time information registers 212, 222, and 232 stores real-time information indicating whether the master block 210, 220, or 230 is a real-time master or a non-real-time master.

Each of the weight registers 213, 223, and 233 stores a weight of the master block 210, 220, or 230. The weight may be determined according to the real-time information, but the inventive concept is not restricted to this configuration. For example, the weight may be determined according to the bandwidth or the latency of a system. The real-time information and the weight of each of the master blocks 210, 220, and 230 may be predetermined according to the characteristic or the operation mode of each master block 210, 220, or 230. The real-time information and the weight may also be set by a manufacturer or a user. The manufacturer may be a manufacturer of the SoC 100 and the user may be a product provider that applies the SoC 100 to a product.

Each of the QoS generators 211', 221', and 231' may generate QoS information using a weight and buffer information. The buffer information indicates the degree of occupancy of a buffer, for example, how much of the buffer is filled with data or empty of data in each master block.

For example, the QoS generator 211' of the first master block 210 may generate first QoS information QR1 using an equation that is programmed in advance based on the weight, the buffer information, and the operation characteristic of the first master block 210. In similar manner, the QoS generators 221' and 231' of the second and third master blocks 220 and 230 respectively generate second and third QoS information QR2 and QR3.

The first through third QoS information QR1, QR2, and QR3 are provided to the bus arbiter 181 and the memory scheduler 140. As described above, the bus arbiter 181 may determine bus use priority based on the first through third QoS information QR1, QR2, and QR3. The memory scheduler 140 may also determine memory access priority based on the QoS information QR1, QR2, and QR3 of the first through third master blocks 210, 220, and 230. The determined memory access priority may be stored within a queue 141 of the memory scheduler 140.

FIG. 4 is a table illustrating a method of generating QoS information according to exemplary embodiments of the inventive concept. Referring to FIG. 4, a weight is predetermined for each of first through third masters M1, M2, and M3. For example, the weights of the respective masters M1, M2, and M3 may be 60, 10 and 30 percent, respectively. The 60, 10 and 30 percent may be expressed as values of 0.6, 0.1 and 0.3, respectively. When the weight is higher, the urgency may also be higher. The buffer information of a buffer may be checked periodically or as it is changed. The buffer information of the respective masters M1, M2, and M3 is denoted by M1_FL, M2_FL, and M3_FL, respectively.

The masters M1, M2, and M3 may generate QoS signals QRx (where x=1, 2, 3) by multiplying the weights 60, 10, and 30 and the buffer information M1_FL, M2_FL, and M3_FL, respectively. The QoS signals QRx may be 0.6×M1_FL, 0.1× M2_FL, and 0.3×M3_FL.

Figure 5:
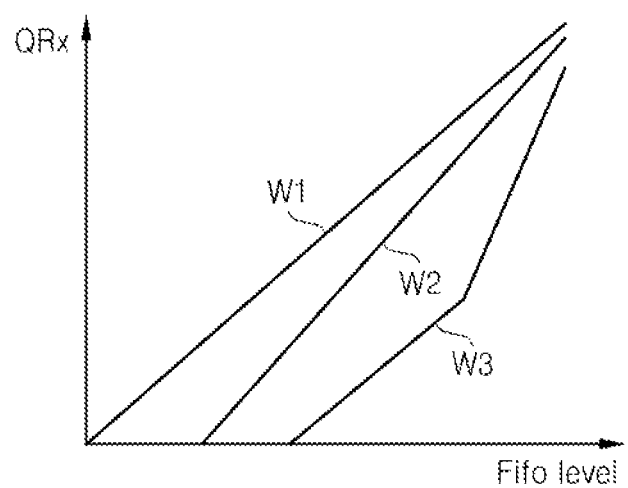
FIG. 5 is a graph illustrating relation among buffer information, weight, and QoS signal according to exemplary embodiments of the inventive concept.

FIG. 5 is a graph illustrating a relationship among buffer information, weight, and QoS signal QRx according to exemplary embodiments of the inventive concept. Referring to FIG. 5, the QoS signal QRx may be a value proportional to the buffer information, e.g., a FIFO level. The proportional degree may be defined by the weight. The weight may have a linear curve as shown in curves W1 and W2 in FIG. 5 or a piece-linear curve as shown in a curve W3. However, the inventive concept is not restricted to this particular arrangement. For example, the weight may have a non-linear curve.

The relation among the buffer information, the weight, and the QoS signal may be predetermined as an equation or stored in the form of a table.

FIGS. 6A through 6C are graphs showing relationships between a FIFO level and QoS information according to exemplary embodiments of the inventive concept. FIGS. 7A through 7C are LUTs corresponding to the graphs illustrated in FIGS. 6A through 6C, respectively.

FIG. 6A shows the linear mapping relation between the FIFO level and the QoS information. Referring to FIG. 6B, the value of the QoS information rapidly increases with respect to the binning to medium value (e.g., around 12) of the FIFO level and is then steady, which is a case where sensitivity is high. Referring to FIG. 6C, the value of the QoS information slowly increases with respect to the binning to medium value (e.g., around 12) of the FIFO level and is then sharply increases, which is a case where the sensitivity is low.

Referring to FIGS. 7A through 7C, LUTs may be provided corresponding to the graphs shown in FIGS. 6A through 6C in advance. In FIGS. 7A through 7C, a LUT index corresponds to the FIFO level and a LUT value corresponds to the QoS information.

Figure 8:
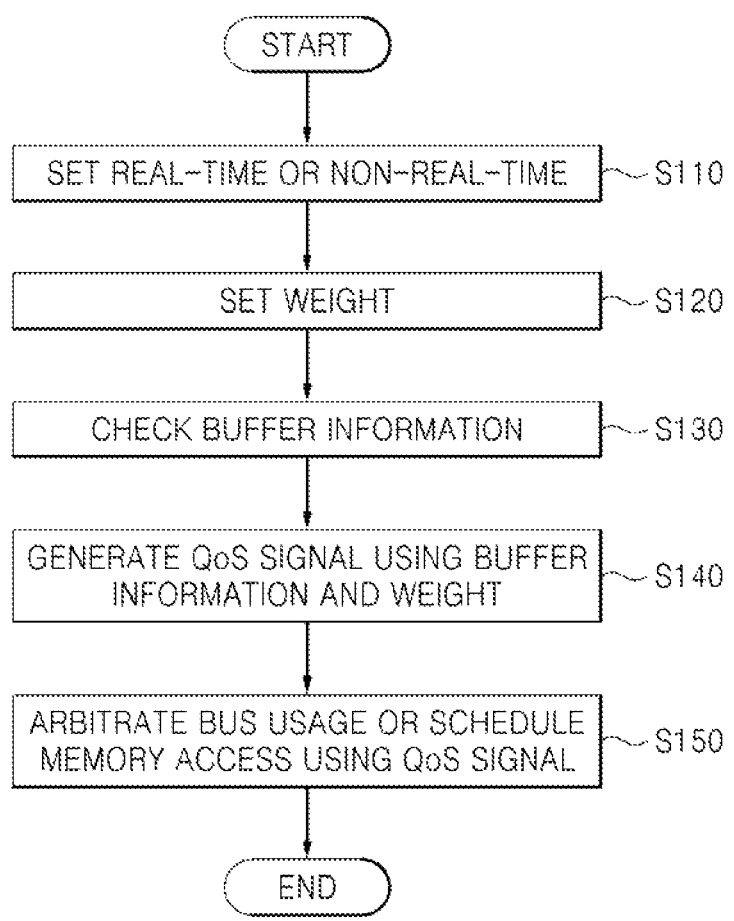
FIG. 8 is a flowchart illustrating a method of operating a SoC according to exemplary embodiments of the inventive concept.

FIG. 8 is a flowchart illustrating a method of operating a SoC according to exemplary embodiments of the inventive concept. Referring to FIG. 8, real-time information indicating whether a master block is a real-time master block or a non-real-time master block is set in a real-time information register of the master block in operation S110.

The real-time or non-real-time of the master block may be set by a user according to the characteristic or operation mode of the master block. The real-time information register may be set to a certain value (e.g., a default value) at the time of manufacture and may later be changed by a user.

Thereafter, a weight register is set in operation S120. Like the real-time information, the weight may be set by a user according to the characteristic or operation mode of the master block. In addition, the weight may be set to a certain value (e.g., a default value) at the time of manufacture and may later be changed by a user. The weight may also be determined depending on the real-time information.

The master block checks buffer information in operation S130.

A QoS generator of the master block generates a QoS signal using the buffer information and the weight in operation S140 and transmits the QoS signal to the bus arbiter 181 and the memory scheduler 140.

The bus arbiter 181 may arbitrate bus usage using the QoS signal and the memory scheduler 140 may schedule memory access using the QoS signal in operation S150.

FIG. 9 is a flowchart illustrating a method of operating a SoC according to exemplary embodiments of the inventive concept. Referring to FIG. 9, a master block checks an operation mode in operation S210 and determines whether the operation mode has been changed in operation S220.

When it is determined that the operation mode has been changed (Yes, S220), a QoS generator of the master block changes a LUT in operation S230. Changing the LUT may be carried out by selecting another LUT from among a plurality of predetermined LUTs based on the changed operation mode or generating and storing a new LUT based on the operation mode.

The master block checks buffer information in operation S240. When it is determined that the operation mode has not been changed (No, Step S220), the step of changing the LUT (Step S230) may be skipped.

The QoS generator of the master block fetches a QoS signal corresponding to the buffer information from the LUT in operation S250 and sends the QoS signal to the bus arbiter 181 and the memory scheduler 140.

The bus arbiter 181 may arbitrate bus usage using the QoS signal and the memory scheduler 140 may schedule memory access using the QoS signal in operation 5260.

The embodiments for increasing the QoS with respect to real-time requests have been described, but the inventive concept is not restricted to those embodiments. For example, a QoS signal may be generated based on the bandwidth or latency of a system and bus use priority or priority of access to a slave block may be determined based on the QoS signal, so that QoS is increased with respect to the bandwidth or latency of the system.

As described above, according to exemplary embodiments of the inventive concept, a master block sends operational urgency information among QoS information to a memory scheduler or a bus arbiter at a real-time request. Accordingly, urgency of the master block for real-time is used in scheduling, and therefore, QoS increases.

In addition, different QoS information is generated according to a product using a master or an operation mode of the master, so that QoS is managed to be above a predetermined level or is increased.

While the inventive concept has been particularly shown and described with reference to exemplary embodiments thereof, it will be understood by those of ordinary skill in the art that various changes in forms and details may be made therein without departing from the spirit and scope of the inventive concept.

What is claimed is:

1. A method of operation a system-on-chip (SoC) including a master block and a slave block, which communicate with each other through a bus, the method comprising:
    storing real-time information indicating whether the master block is a real-time block in a real-time information register of the master block;
    storing a weight information in a weight register of the master block based on the real-time information;
    checking buffer information of the master block;
    generating a quality-of-service (QoS) signal using the buffer information and the weight information; and
    determining a priority of the master block for using the bus based on the QoS signal.

2. The method of claim 1, further comprising determining a priority of the master block for accessing the slave block based on the QoS signal.

3. The method of claim 2, wherein the determining the priority of the master block for using the bus comprises:
    sending a bus use request signal comprising the QoS signal from the master block to a bus arbiter; and
    permitting, by the bus arbiter, the master block to use the bus over another master block having a lower priority based on the QoS signal provided to the bus arbiter as part of a request signal.

4. The method of claim 2, wherein the determining the priority of the master block to access the slave block comprises:
    sending a slave access request signal comprising the QoS signal from the master block to the slave block; and
    permitting, by the slave block, the master block having higher priority than the other master block to access the slave block based on the QoS signal provided to the slave block as part of a slave access request signal.

5. The method of claim 4, wherein the slave block comprises a memory scheduler configured to schedule an access to a memory.

6. The method of claim 1, wherein the QoS signal has a linear, non-linear or piece-linear relation with the buffer information.

7. A method of operation a system-on-chip (SoC) including a master block and a slave block, which communicate with each other through a bus, the method comprising:
    storing a look-up table comprising a plurality of quality-of-service (QoS) signals in the master block;
    checking buffer information of the master block;
    fetching a QoS signal corresponding to the buffer information from the look-up table; and
    determining a priority of the master block to use the bus based on the QoS signal.

8. The method of claim 7, wherein the look-up table is changed according to an operation mode of the master block.

9. The method of claim 8, further comprising selecting a look-up table from among a plurality of look-up tables according to the operation mode of the master block when the plurality of look-up tables are provided.

10. The method of claim 8, further comprising generating and storing the look-up table according to the operation mode of the master block.

11. The method of claim 7, further comprising determining a priority of the master block to access the slave block based on the QoS signal.

12. The method of claim 11, wherein the determining of the priority of the master block to use the bus comprises:
sending a bus use request signal comprising the QoS signal from the master block to a bus arbiter; and
permitting, by the bus arbiter, the master block to use the bus over another master block having a lower priority based on the QoS signal provided to the bus arbiter as part of the bus use request signal.

13. The method of claim 11, wherein the determining the priority of the master block to access the slave block comprises:
sending a slave access request signal comprising the QoS signal from the master block to the slave block; and
permitting, by the slave block, the master block having higher priority than the other master block to access the slave block based on the QoS signal provided to the slave block as part of the slave access request signal.

14. The method of claim 13, wherein the slave block comprises a memory scheduler configured to schedule an access to a memory.

15. A system-on-chip comprising:
a plurality of master blocks;
a slave block; and
a bus configured to carry communications signals between the plurality of master blocks and the slave block,
wherein each of the plurality of master blocks comprises:
a buffer configured to store data to be transmitted to or received from the bus; and
a quality-of-service (QoS) generator configured to retrieve information of the buffer and generate a QoS signal using the retrieved buffer information,
wherein the bus comprises a bus arbiter configured to determine a priority of each of the plurality of master blocks to use the bus based on the QoS signal of each of the plurality of master blocks, and
wherein the QoS signal of each of the plurality of master blocks has a value set according to an operation modes of each of the plurality of master blocks.

16. The system-on-chip of claim 15, wherein each of the plurality of master blocks further comprises:
a real-time information register configured to store real-time information indicating whether each of the plurality of master blocks is a real-time block; and
a weight register configured to store a weight of each of the plurality of master blocks based on the real-time information, and
wherein the QoS generator generates the QoS signal using the buffer information and the weight.

17. The system-on-chip of claim 15, wherein the QoS generator comprises a plurality of look-up tables each of which comprises a plurality of QoS entries, the QoS generator selects one of the look-up tables based on the operation mode of the master block, and the QoS generator fetches a QoS entry corresponding to the buffer information from the selected look-up table.

18. The system-on-chip of claim 15, wherein the QoS generator generates and stores a look-up table according to the operation mode of the master block and fetches QoS information corresponding to the buffer information from the look-up table.

19. The system-on-chip of claim 15, wherein the slave block determines a priority of each of the plurality of master block to access the slave block based on the QoS signal.

20. The system-on-chip of claim 15, wherein the slave block comprises a memory scheduler configured to schedule an access to a memory.

21. A method of operation a system-on-chip (SoC), comprising:
storing real-time information indicating whether a first master block is a real-time block in a first register of the first master block;
storing real-time information indicating whether a second master block is a real-time block in a first register of the second master block;
storing weight information for the first master block in a second register of the first master block based on the real-time information indicating whether the first master block is a real-time block;
storing weight information for the second master block in a second register of the second master block based on the real-time information indicating whether the second master block is a real-time block;
checking buffer information of the first and second master blocks;
generating a quality-of-service (QoS) signal for the first master block using the buffer information and the weight information for the first master block;
generating a quality-of-service (QoS) signal for the second master block using the buffer information and the weight information for the second master block; and
determining a relative priority of the first and second master blocks for using the bus based on the generated QoS signals for the first and second master block.

22. An electronic system comprising:
a system-on-chip (SoC); and
a non-volatile memory configured to store data used by the SoC,
wherein the SoC comprises:
a plurality of master blocks;
a slave block; and
a bus configured to carry communications signals between the plurality of master blocks and the slave block,
wherein each of the plurality of master blocks comprises:
a buffer configured to store data to be transmitted to or received from the bus; and
a quality-of-service (QoS) generator configured to retrieve information of the buffer and generate a QoS signal using the retrieved buffer information,
wherein the bus comprises a bus arbiter configured to determine a priority of each of the plurality of master blocks to use the bus based on the QoS signal of each of the plurality of master blocks, and
wherein the QoS signal of each of the plurality of master blocks has a value set according to an operation modes of each of the plurality of master blocks.

* * * * *

UNITED STATES PATENT AND TRADEMARK OFFICE
CERTIFICATE OF CORRECTION

Page 1 of 1

PATENT NO. : 8,793,420 B2
APPLICATION NO. : 13/604516
DATED : July 29, 2014
INVENTOR(S) : Hong Ho Roh It is certified that error appears in the above-identified patent and that said Letters Patent is hereby corrected as shown below:

On the Title Page

ITEM (30) FOREIGN APPLICATION PRIORITY DATE READS:

"SEPTEMBER 19, 2011"

ITEM (30) FOREIGN APPLICATION PRIORITY DATE SHOULD READ:

--SEPTEMBER 16, 2011--.

Signed and Sealed this
Twenty-first Day of October, 2014

Michelle K. Lee
*Deputy Director of the United States Patent and Trademark Office*